United States Patent [19]

Ducasse et al.

[11] 4,133,375

[45] Jan. 9, 1979

[54] VERTICAL HEAT EXCHANGER

[75] Inventors: Joseph C. V. Ducasse, Martinez; Jean Bouvet, San Anselmo, both of Calif.

[73] Assignee: Unice Machine Company, San Francisco, Calif.

[21] Appl. No.: 763,536

[22] Filed: Jan. 28, 1977

[51] Int. Cl.[2] .............................................. F28F 5/04
[52] U.S. Cl. ...................................... 165/92; 165/65; 366/147; 422/245
[58] Field of Search .................. 165/65, 92; 23/273 R; 366/147

[56] References Cited

U.S. PATENT DOCUMENTS

| 176,851 | 5/1876 | Force ....................................... 165/92 |
| 846,187 | 3/1907 | Davis ....................................... 165/92 |
| 1,356,822 | 10/1920 | Jacobseon ............................... 165/92 |

FOREIGN PATENT DOCUMENTS 992371  7/1951  France ........................................ 165/92

*Primary Examiner*—Albert W. Davis, Jr.
*Attorney, Agent, or Firm*—Wenderoth, Lind & Ponack

[57] ABSTRACT

A cylindrical shell has a conical bottom with a central outlet therein. A hollow central shaft is rotatably and vertically supported within the center of the shell and has attached thereto at least one heat exchange element including lower and upper radial tubes. Hollow rectangular ducts extend vertically between the upper and lower radial tubes. Heat exchange fluid flows from the upper end of the shaft, radially outwardly through the lower radial tubes, upwardly through the rectangular ducts, radially inwardly through the upper radial tubes, and to the upper end of the shaft.

33 Claims, 6 Drawing Figures

VERTICAL HEAT EXCHANGER

BACKGROUND OF THE INVENTION

The present invention relates to a vertically aligned continuous rotary heat exchanger and heat exchanger elememt therefor for the continuous processing of various materials while heating, cooling and stirring such materials.

The present invention is particularly directed to a vertically aligned continuous crystallizer for the crystallization processing of sugar massecuites.

It is known that the crystallization processing of sugar massecuites, i.e. the separation of sugar crystals from molasses, is very delicate and requires accurate temperature control in order to prevent formation of improper grains. Such crystallization processing also requires a progressive and uniform growth of the sugar crystals. In a continuous process, this is possible only if a progressive and uniform decrease in the massecuite temperature is maintained along the length of the crystallizer apparatus during the cooling period. This requires that the cooling fluid circulate in a direction generally opposite to that of the massecuite.

There are known a number of different types of heat exchangers which have been used in the crystallization processing of sugar massecuites. The most preferred of such heat exchangers have been of the type which allow for continuous operation and in which the hot massecuite enters one end of the heat exchanger and moves in a horizontal direction to exit at the opposite end, while the cooling fluid, normally water, circulates horizontally through various tubes or discs mounted on a horizontal rotating shaft in a direction substantially opposite to that of the massecuite.

However, in such horizontal systems it is difficult to achieve uniform flow of the material in the horizontal direction. It is furthermore difficult to obtain uniform flow of the cooling fluid. Finally, such horizontal systems place a very considerable weight on the rotating horizontal shaft which sometimes requires the use of intermediate bearings to prevent undue deflection of the rotating shaft. Such horizontal systems additionally require the use of stuffing boxes.

SUMMARY OF THE INVENTION

With the above discussion in mind, it is an object of the present invention to provide a novel rotary heat exchanger and heat exchanger element, particularly for use in the crystallization processing of sugar massecuites, which eliminates the above mentioned disadvantages of prior known such devices.

It is specifically an object of the present invention to provide a continuous heat exchanger system wherein massecuite flows downwardly in a uniform manner throughout the entire cross-sectional area and throughout the entire height of the system.

It is a further object of the present invention to provide such a heat exchanger system wherein cooling and/or reheating fluid may be caused to flow uniformly in a generally upward direction across the entire area and throughout the entire height of the massecuite.

A corollary object of the present invention is to provide such a system which will achieve a substantially uniform and progressive alteration of the massecuite temperature, in the direction of flow of the material, throughout the entire system.

An even further object of the present invention is to provide such a system whereby the central rotating shaft is vertically aligned, thereby eliminating the problem of dead weight bending moments acting on the central shaft which are inherent in previous horizontal such systems, and thus eliminating the need for providing intermediate bearings to overcome such bending moments.

The above objects are achieved in accordance with the present invention by the provision of a vertically aligned continuous heat exchanger including a generally cylindrical shell or container having a substantially conical bottom and an open top. The material, such as sugar massecuite, to be treated is introduced into the top of the shell and exits through a central bottom opening in the conical bottom of the shell. A hollow central shaft is vertically aligned concentrically within the shell and is rotatably supported immediately above the central outlet opening by means of a bearing. Adjacent the upper end of the central shaft is fixed a dome or cover to the underside of the outer edge of which are supported a plurality of wheels or bearings which rotate on a circular rail provided on the top of the shell, thereby providing rotating support for the dome and the central shaft.

Suspended from the dome and attached to the central shaft is a heat exchange coil system including a plurality of lower horizontal tubes extending radially outwardly from the central shaft and a plurality of upper horizontal tubes extending radially outwardly from the central shaft. The upper radial tubes are located above the lower radial tubes. Each adjacent pair of upper radial tubes, and the corresponding lower radial tubes define a cylindrical sector. Between each pair of adjacent upper radial tubes and between each pair of adjacent lower radial tubes extend a plurality of chord tubes. The chord tubes in each circular sector defined by adjacent radial tubes are radially spaced from the central shaft. In a given cylindrical sector the chord tubes between the upper radial tubes are aligned vertically above the corresponding chord tubes between the respective lower radial tubes.

Each upper chord tube and the corresponding lower chord tube have extending therebetween a rectangular vertically extending hollow duct. The respective upper and lower chord tubes have a plurality of openings or perforations communicating with the interior of the respective hollow duct.

That portion of the central shaft extending above the dome has concentrically arranged thereabout an inlet sealed water box and an outlet sealed water box, each having a couplet connected to a respective cooling fluid inlet source and discharge outlet. The sealed water boxes communicate through respective openings in the central shaft to respective upper inlet and outlet chambers. Adjacent the lower portion of the central shaft there is provided therein a lower heat exchange inlet chamber which communicates through respective openings in the central shaft with each of the lower radial tubes. Located within the central shaft, adjacent the upper radial tubes, is a lower heat exchange outlet chamber which communicates through openings in the central shaft with each of the upper radial tubes. A tube is vertically positioned within the central shaft and communicates between the upper heat exchange inlet chamber and the lower heat exchange inlet chamber. A further hollow tube is vertically arranged within the central shaft and communicates between the lower heat exchange outlet chamber and the upper heat exchange outlet chamber.

During operation of the system, material to be treated, such as sugar massecuite, is introduced into the upper portion of the shell and moves uniformly downwardly through the shell at a controlled rate through the outlet in the center of the conical bottom of the shell. The dome, the central shaft, and the various heat exchange elements, including the radial tubes, the chord tubes and the vertical hollow ducts, are rotated. Heat exchange fluid is introduced through the heat exchange inlet sealed water box to the upper heat exchange inlet chamber and passes downwardly through the inlet vertical tube to the lower heat exchange inlet chamber. From there the heat exchange fluid flows radially outwardly through each of the lower radial tubes. The fluid flows from each lower radial tube in a substantially circumferential or chordal direction through opposite lateral chord tubes. The heat exchange fluid flows from each chord tube upwardly, through the perforations therein, into the respective hollow vertical rectangular duct. The heat exchange fluid flows from each vertical duct through the perforations in the upper chord tubes into the upper chord tubes. The heat exchange fluid then flows from each chord tube toward both ends thereof into opposite adjacent upper radial tubes. The heat exchange fluid flows from each upper radial tube radially inwardly to the lower heat exchange outlet chamber, and from there through the outlet vertical tube to the upper heat exchange outlet chamber. From there, the heat exchange fluid flows outwardly into the outlet sealed water box.

By the above arrangement, while the material to be treated, such as sugar massecuite, is uniformly flowing downwardly toward the outlet in the conical bottom of the shell, the heat exchange fluid is passed uniformly in a direction substantially opposite to the flow of the massecuite. Due to the arrangement of the heat exchange elements, the massecuite is subjected to a very uniform and progressive heat exchange action. A great portion of the massecuite is contacted by various of the heat exchange elements, and the heat exchange elements have a very large surface area, thereby facilitating both thorough and uniform heat exchange.

When treating sugar massecuite by the heat exchanger of the present invention, the heat exchange elements are used to cool hot massecuite, thus causing supersaturation of the mother liquor, and eventually growth of the crystals contained in the massecuite. Due to the above discussed arrangement of the cooling elements, the crystal growth will be progressive in the vertical downward direction, will be uniform throughout the horizontal cross-section of the massecuite at any vertical position thereof, and may be controlled at a desired rate.

Further, it is known in the crystallization processing of sugar massecuite that after the crystals are formed, they must be separated from the molasses of the massecuite. This separation is normally done by filtering or sieving. However, during the crystallization processing, to achieve maximum deposit of sugar crystals, the massecuite is cooled down to a temperature which is normally below that temperature at which efficient separation of the sugar crystals from the molasses may occur. Accordingly, it has in the past been common practice to pass the massecuite having sugar crystals therein from the crystallizer to a separate heating system to heat the massecuite to a temperature sufficient to achieve fluidity satisfactory for the separation of the sugar crystals from the molasses.

In accordance with the present invention however, it is possible to provide this reheating operation in the same shell as employed in the crystallization process, and to achieve the same uniform heat exchange relationship to reheat the massecuite as is obtained in the cooling of the massecuite for crystallization.

Specifically, in accordance with the present invention there is arranged a second heat exchange element, vertically below the first exchange element which is used for cooling the massecuite. The second heat exchange element is identical in structure and is supported by the first heat exchange element.

BRIEF DESCRIPTION OF THE DRAWINGS

A specific preferred embodiment of the present invention will now be discussed in more detail below, with reference to the accompanying drawings, wherein.

DETAILED DESCRIPTION OF THE INVENTION

The specific structure of one preferred embodiment of the present invention will now be described with reference to the drawings.

Figure 1:
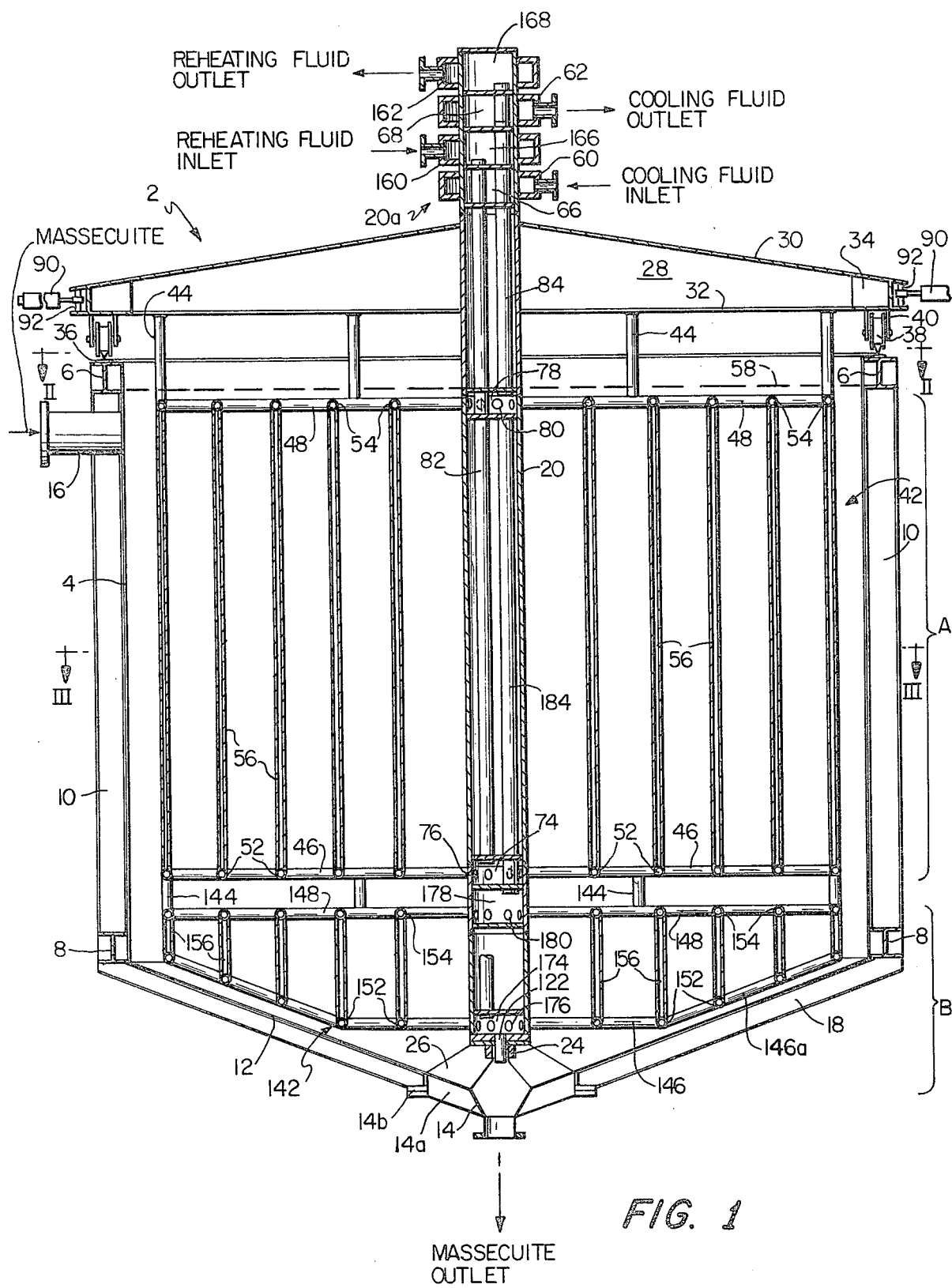
FIG. 1 is a somewhat schematic view, in longitudinal cross-section, taken along line I—I of FIG. 2.
Figure 2:
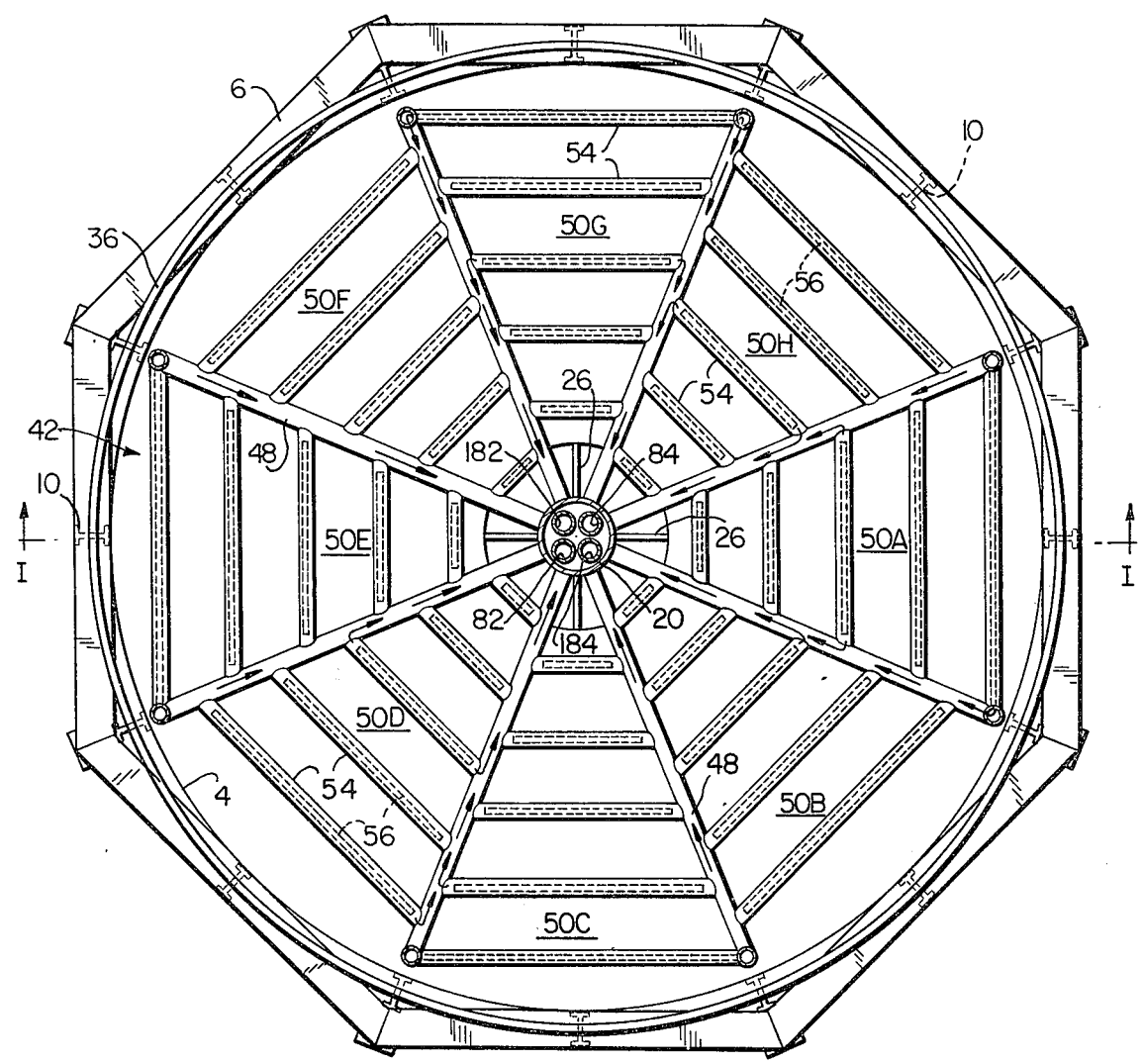
FIG. 2 is a horizontal cross-sectional view taken along line II—II of FIG. 1.
Figure 3:
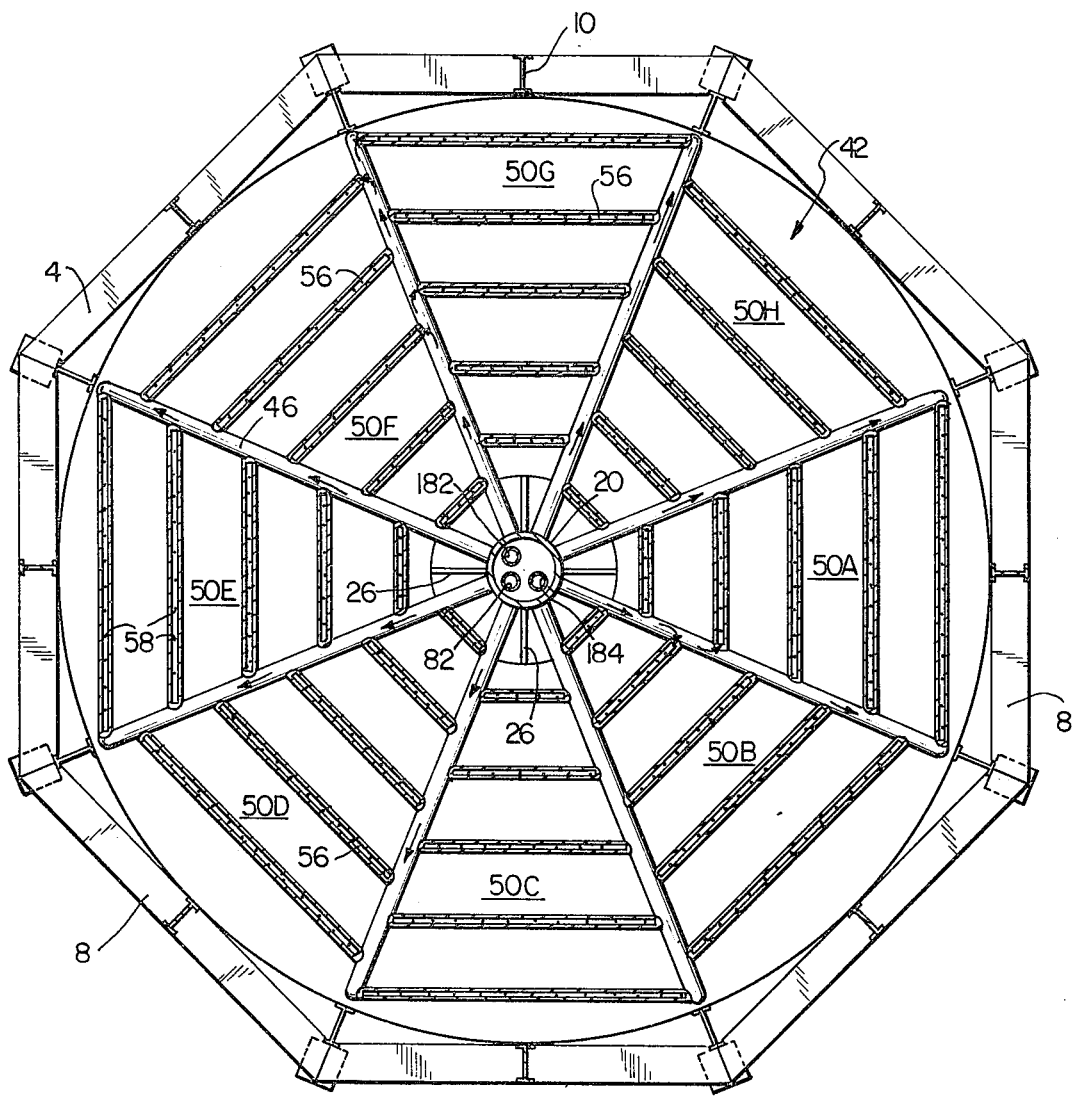
FIG. 3 is a horizontal cross-sectional view taken along line III—III of FIG. 1.

In FIGS. 1-3 of the drawings, the heat exchanger system of the present invention is particularly described with reference to a massecuite crystallizer 2. Crystallizer 2 includes an outer shell or container 4 of generally cylindrical configuration having a conical bottom 12 with a central outlet 14 therein. Although it is preferred that shell 4 be generally cylindrical in form, it could be made of some other configuration, such as polygonal when viewed from above, by cylindrical is preferred to enable more uniform heat exchange treatment of all massecuite located within the shell. The size of the shell would of course vary from installation to installation. The shell may be made of any suitable material which is compatible with the material being treated.

The upper portion of the shell is provided with any type of suitable material inlet 16. The shell may be exteriorly strengthened such as by channels, for example H-shaped channels. In the illustrated embodiment, the shell 4 is strengthened by upper horizontal channels 6, lower horizontal channels 8, and vertical channels 10. Additionally, conical bottom 12 of shell 4 may be strengthened by channels 18. The precise location and arrangement of the strengthening channels would of course vary from installation to installation, depending upon the size and strength requirements of the particular installation. A central shaft 20 is vertically and coaxially rotatably supported within shell 4. Central shaft 20 is hollow, and a lower axle 22 thereof is rotatably supported by a guide bearing 24 which is supported such as by brackets 26 mounted on the interior of conical bottom 12 adjacent outlet 14. A dome 28 is attached to central shaft 20 at a position spaced from the upper end thereof. Dome 28 acts as a cover for shell 4 and as an upper support for central shaft 20. Dome 28 may be formed in various desired manners, but the illustrated embodiment shows dome 28 as including an upper conical member 30 and a lower substantially horizontal member 32, each of which are joined such as by welding to central shaft 20, and each of which are joined peripherally such as by channel members 34.

On the top of channel members 6 is mounted a circular rail 36. A plurality, for example eight, wheels 38 are supported below the outer periphery of dome 28, for example by suitable brackets 40. Upon rotation of dome 28 and central shaft 20, wheels 38 will ride on circular rail 36.

A heat exchange unit 42 is attached to central shaft 20 to rotate therewith, and is supported by dome 28, for example by hanging brackets 44. Heat exchange unit 42 includes a plurality, for example eight, lower horizontal tubes 46 attached to and extending radially outwardly from central shaft 20. Heat exchange unit 42 also includes an equal plurality, for example eight, of upper horizontal tubes 48 attached to and extending radially outwardly from central shaft 20. Corresponding lower radial tubes 46 are vertically aligned with respective upper radial tubes 48. Adjacent pairs of lower radial tubes 46 and corresponding upwardly aligned adjacent pairs of upper radial tubes 48 define therebetween cylindrical segments 50A-50H, as shown particularly in FIGS. 2 and 3 of the drawings. It is to be understood that the heat exchange unit 42 may include any desired plurality of lower and upper radial tubes 46 and 48, other than the specific number illustrated in the drawings.

Each adjacent pair of lower radial tubes 46 is joined by a plurality, for example five, of horizontal tubes 52 which collectively extend in a substantially circumferential direction and which are hereinafter referred to as chord tubes. Similarly, each adjacent pair of upper radial tubes 48 are joined by an equal plurality, for example five, of chord tubes 54. Within a given cylindrical sector volume, such as for example volume 50A, the lower chord tubes 52 are vertically aligned with the corresponding upper chord tubes 54. Further, as is particularly illustrated in FIGS. 2 and 3 of the drawings, the chord tubes of adjacent cylindrical sector volumes are radially offset from each other. For example, the chord tubes 52 and 54 of sector volume 50A are positioned further radially outwardly from central shaft 20 than the corresponding chord tubes 52 and 54 of adjacent sector volumes 50B and 50H. This facilitates a more thorough and uniform stirring and heat exchange treatment of the material, for example sugar massecuite, within the shell 4.

Between each lower chord tube 52 and the corresponding upper chord tube 54 there extends a vertical rectangular hollow duct 56. Each lower chord tube 52 has on the upper surface thereof, and each upper chord tube 54 has on the lower surface thereof, openings or apertures 58 which communicate the interiors of chord tubes 52 and 54 with the interiors of the respective rectangular ducts 56. Rectangular ducts 56 are accordingly in the form of thin flat hollow plates and act to stir the material, such as sugar massecuite, in the shell 4 as the central shaft 20 rotates.

When the heat exchange system of the present invention is used for the crystallization processing of sugar massecuite, massecuite is continuously introduced into shell 4 through inlet 16 at a rate sufficient to maintain a lever 58. Treated massecuite exits from shell 4 at a controlled rate through exit 14. Dome 28, central shaft 20, and heat exchange element 42 are rotated at a desired rate of speed to obtain a desired heat exchange treatment, in this case cooling, of the sugar massecuite. This causes supersaturation of the massecuite, and thereby growth of sugar crystals contained in the massecuite.

It is generally known in the sugar crystallization art that the temperature to obtain maximum deposit of sugar crystals is lower than the temperature whereat the sugar crystals may thereafter be separated from the molasses of the massecuite.

Accordingly, in accordance with a further feature of the present invention, it is possible not only to achieve crystallization of the massecuite by the heat exchange element 42 in the zone A, but also to thereafter reheat the massecuite within the shell 4 to a temperature sufficient to achieve separation, for example by filtering or sieving, of the formed sugar crystals from the molasses of the massecuite, in an additional vertically lower zone B.

This is achieved in accordance with a preferred embodiment of the present invention by the provision of a second heat exchange element 142 located below the above discussed heat exchange element 42 within the shell 4. Heat exchange element 142 is in substantially all respects the same as heat exchange element 42. The only substantial difference is that each lower radial tube 146 has a radially outward portion 146a which is inclined to conform to the configuration of inclined bottom 12 of shell 4. Thus, lower heat exchange unit 142 is attached to central shaft 20 and is suspended from upper heat exchange element 42 by means of hanging brackets 144. Heat exchange element 142 includes lower radial tubes 146 attached to and extending radially outwardly from central shaft 20, and upper radial tubes 148 attached to and extending radially outwardly from central shaft 20. Adjacent lower radial tubes 146 are joined by lower chord tubes 152, and adjacent upper radial tubes 148 are joined by chord tubes 154. Between respective aligned chord tubes 152 and upper chord tubes 154 there extend vertical rectangular hollow ducts 156. Chord tubes 152 and 154 have therein perforations or openings, similar to openings 58, to communicate the interiors of chord tubes 152 and 154 with the interiors of vertical ducts 156.

By the above arrangement, and with reference to FIG. 1 of the drawings, the massecuite introduced into shell 4 through inlet 16 is cooled by upper heat exchange element 42 during zone A to achieve crystal growth of the sugar crystals. Thereafter, in zone B, the massecuite is reheated by heat exchange element 142 to a temperature such that when the massecuite is withdrawn through outlet 14 it has sufficient fluidity that it may be efficiently subjected to a filtration or sieving operation to separate the sugar crystals from the molasses of the massecuite.

Heat exchange fluid is supplied to and discharged from the upper heat exchange element 42 and the lower heat exchange element 142, through the central shaft 20, in any suitable manner. It is particularly preferred that the heat exchange inlets and outlets all be at the upper end of central shaft 20, and particularly at a location thereon above dome 28.

Figure 4:
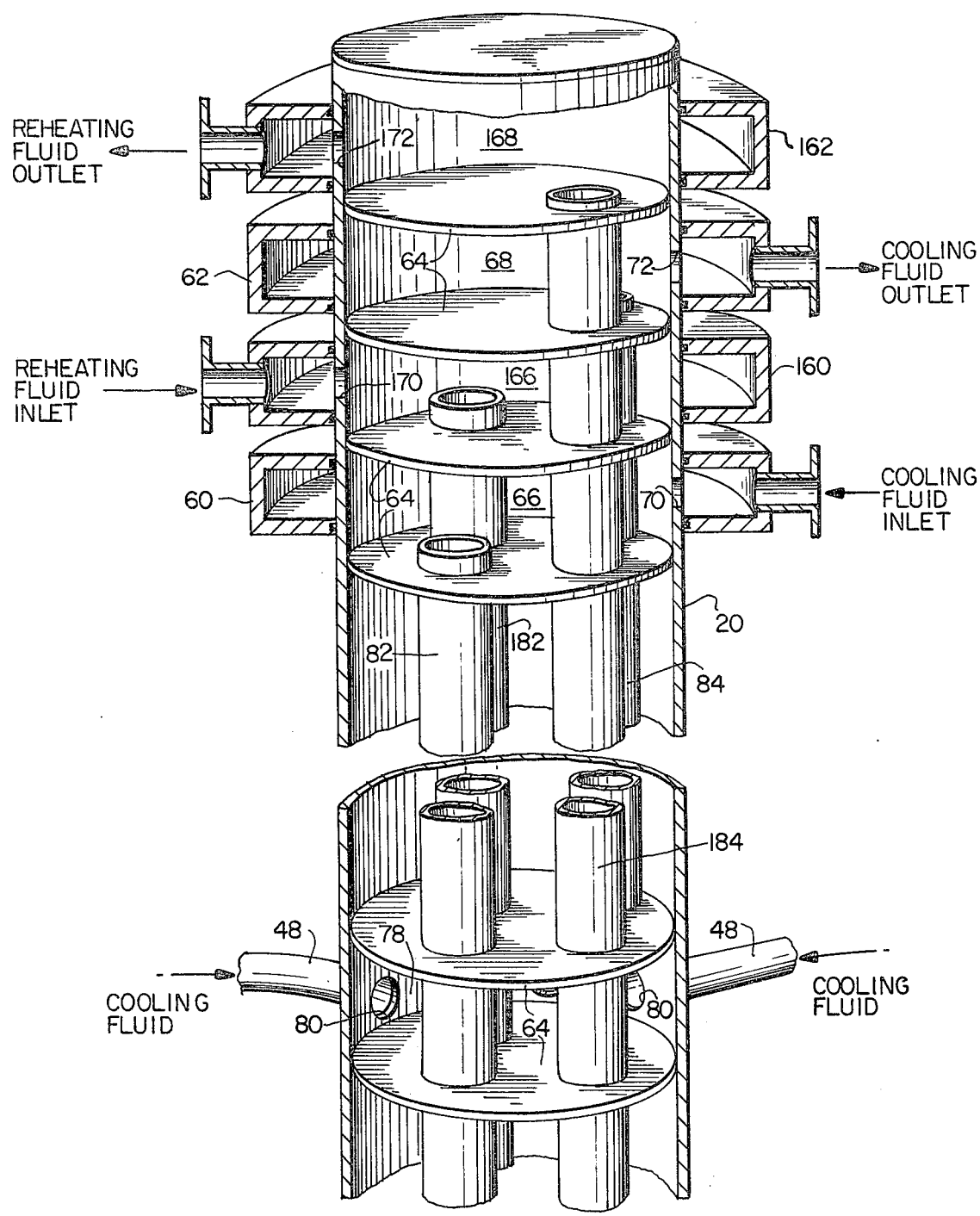
FIG. 4 is an enlarged cross-sectional perspective view of the upper portion of the central shaft of FIG. 1.
Figure 5:
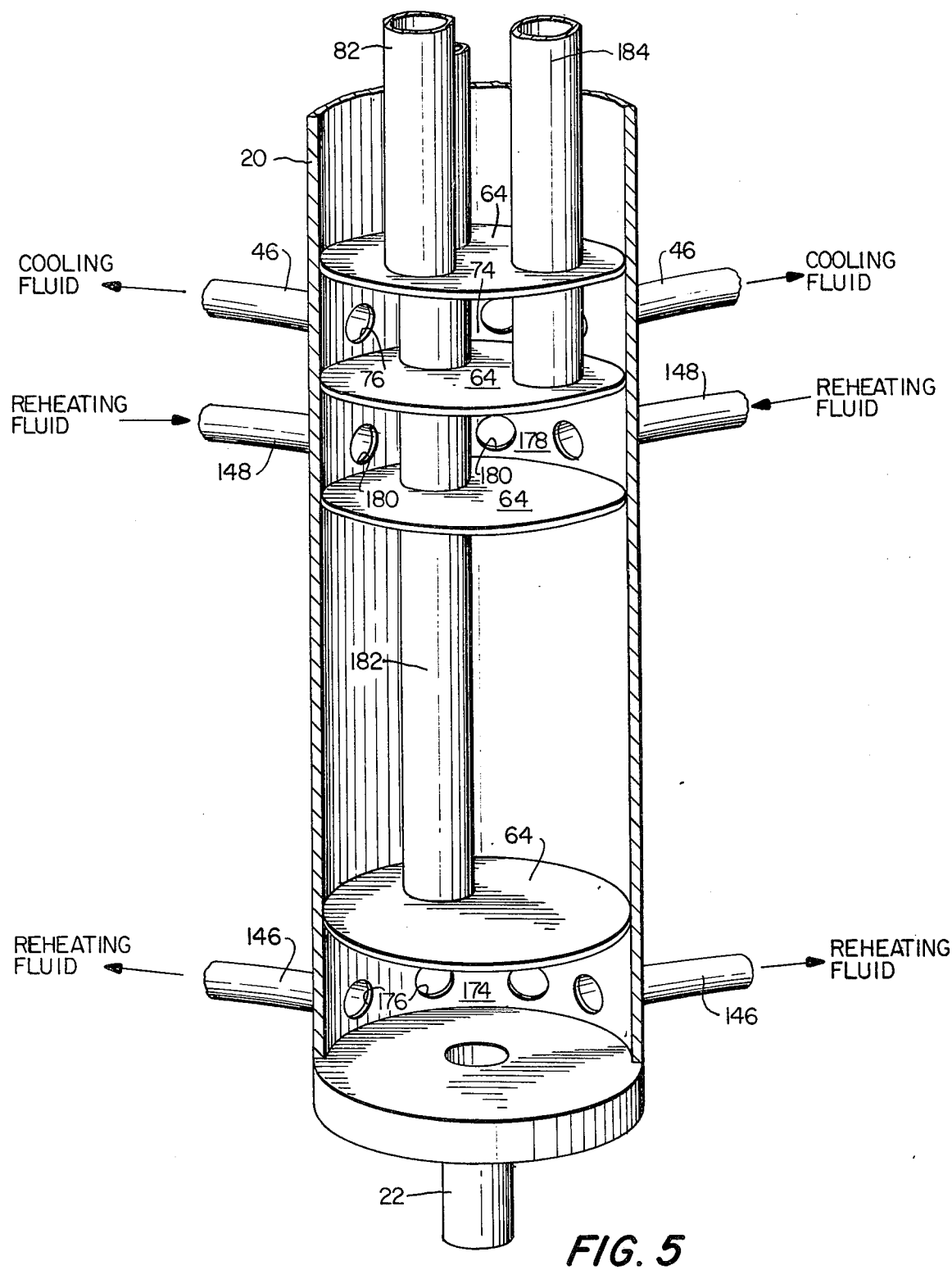
FIG. 5 is an enlarged cross-sectional perspective view of the lower portion of the central shaft of FIG. 1.
Figure 6:
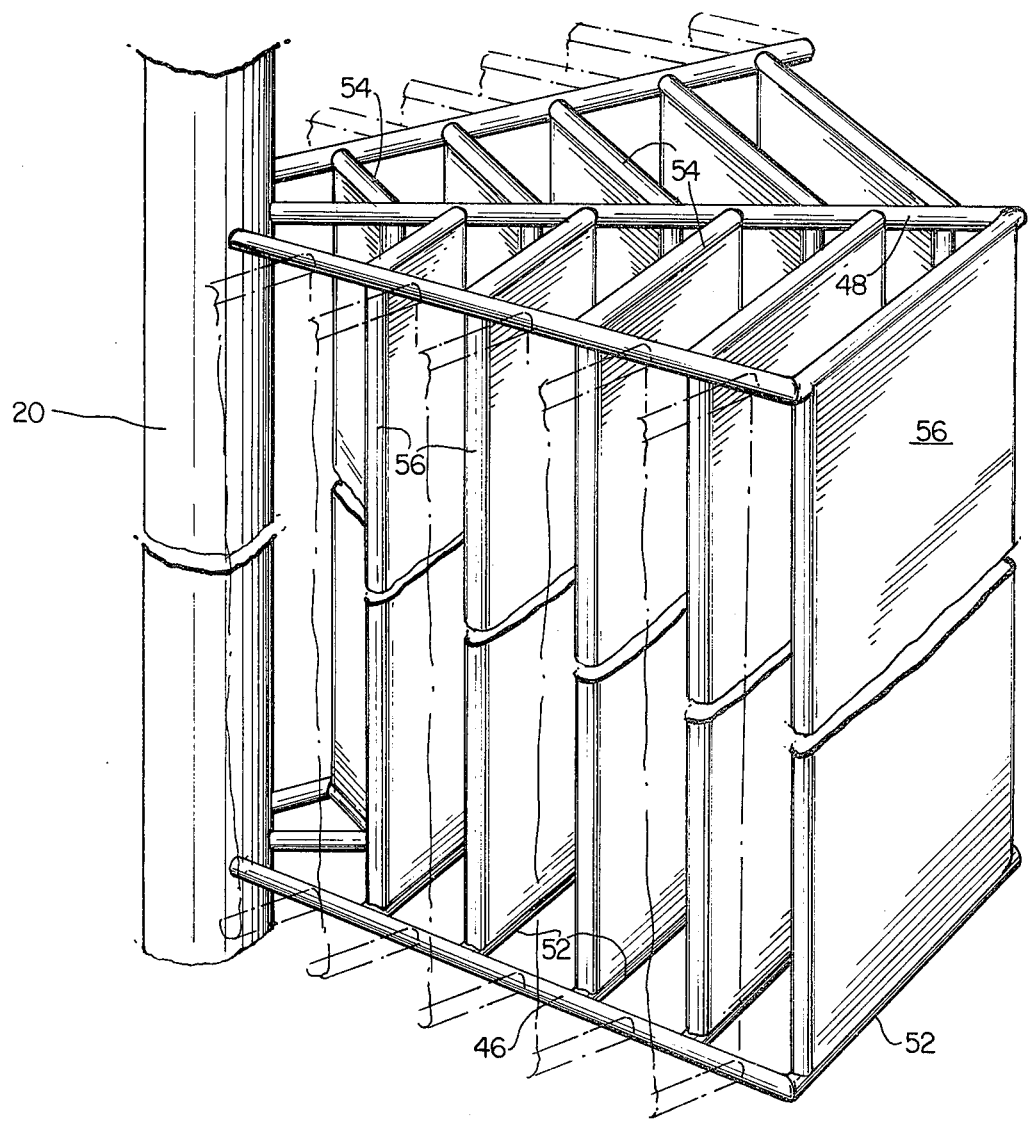
FIG. 6 is an enlarged perspective view of a portion of the upper heat exchange element shown in FIG. 1, a portion only being shown for clarity of illustration.

In the specifically illustrated preferred embodiment of the present invention, and as particularly illustrated in FIGS. 1, 4 and 5 of the drawings, heat exchange fluid is supplied to and discharged from central shaft 20, and particularly that portion extending above dome 28, by means of a plurality of non-rotatable connection members, such as sealed water boxes 60, 62, 160 and 162, each having a respective coupling member for attachment to a respective source or discharge. A plurality of circular plates 64 sealingly divide the interior of the upper or connection portion 20a of central shaft 20 into a plurality of fluid-tight chambers 66, 68, 166 and 168, respectively communicating through orifices 70, 72, 170 and 172 with sealed water boxes 60, 62, 160 and 162.

In the lower portion of the interior of central shaft 20 additional plates 64 define further fluid-tight chambers. Specifically, adjacent lower radial tubes 46 of upper heat exchange element 42 there is formed a lower cooling fluid inlet chamber 74 communicating through openings 76 in central shaft 20 with each of the lower radial tubes 46 of the upper heat exchange element 42. Similarly, adjacent upper radial tubes 48 of the upper heat exchange element 42 there is formed a lower cooling fluid outlet chamber 78 communicating through openings 80 in central shaft 20 with each of the upper radial tubes 48 of upper heat exchange element 42.

In a similar manner, adjacent lower radial tubes 146 of lower heat exchange element 142, there is formed a lower reheating fluid inlet chamber 174 communicating through openings 176 in central shaft 20 with each of the lower radial tubes 146 of lower heat exchange element 142. Adjacent upper radial tubes 148 of lower heat exchange element 142 there is formed a lower reheating fluid outlet chamber 178 communicating through openings 180 in central shaft 20 with each of the upper radial tubes 148 of lower heat exchange element 142.

Between each of the upper fluid inlet and outlet chambers, located in upper portion 20a of central shaft 20, and the respective lower inlet or outlet chambers, located within that portion of central shaft 20 positioned within shell 4, there extends a connecting tube. More particularly, connecting tube 82 extends between upper cooling fluid inlet chamber 66 and lower cooling fluid inlet chamber 74. Connecting tube 182 extends between upper reheating fluid inlet chamber 166 and lower reheating fluid inlet chamber 174. Connecting tube 84 extends between lower cooling fluid outlet chamber 78 and upper cooling fluid outlet chamber 68. Finally, connecting tube 184 extends between lower reheating fluid outlet chamber 178 and upper reheating fluid outlet chamber 168.

The flow of cooling fluid through the heat exchange element to cool the massecuite to provide sugar crystal growth is as follows.

A suitable cooling fluid, such as water, from a suitable source is supplied into sealed water box 60 through the coupling therein, and passes through opening 70 in central shaft 20 into upper cooling fluid inlet chamber 66. The cooling water then passes through connecting tube 82 into lower cooling fluid inlet chamber 74, and then passes through the plurality of openings 76 into each of the lower radial tubes 46 of the upper heat exchange element 42. The cooling fluid flows radially outwardly through each of the lower radial tubes 46 and from each such tube 46 into opposite adjacent connecting chord tubes 52. In other words, the cooling fluid passes from each lower radial tube 46 into chord tubes in opposite adjacent cylindrical sectors. The cooling fluid flowing into each chord tube 52 from opposite ends thereof passes through the openings or perforations 58 therein into the interior of the respective vertical rectangular duct 56. Cooling fluid passes from the top of each vertical rectangular duct 56 into each of the upper chord tubes 54 through the perforations or openings therein. The cooling fluid then flows through each chord tube 54 toward opposite ends thereof and passes into respective upper radial tubes 48. The fluid then passes radially inwardly from each upper radial tube 48 through respective openings 80 in central shaft 20 into lower cooling fluid outlet chamber 78. The fluid passes from chamber 78 through connecting tube 84 into upper cooling fluid outlet chamber 68. The cooling fluid then passes through opening 72 in central shaft 20 into cooling fluid outlet sealed water box 62 and from there to a suitable cooling fluid discharge.

The flow of the cooling fluid within the above system is illustrated by arrows, particularly in FIGS. 1-3 of the drawings. During such cooling fluid flow, and while upper heat exchange element 42 is rotated by central shaft 20 and dome 28, the massecuite within shell 4 is uniformly cooled from the top to the bottom of zone A. Due to the substantially uniform flow of the cooling fluid throughout the cross-section of the massecuite, due to the flow of the cooling fluid in a direction substantially opposite to that of the massecuite, and due to the large surface area of the cooling elements, paticularly the flat rectangular plates 56, the crystal growth within the massecuite is not only progressive, but also is uniform.

The lower or reheating heat exchange element 142 operates in a very similar manner. Specifically, reheating fluid, such as heated water or steam, is introduced from a suitable source into reheating fluid inlet sealed water box 160 and passes through opening 170 in central shaft 20 to upper reheating fluid inlet chamber 166. The reheating fluid then passes through connecting tube 182 to lower reheating fluid inlet chamber 174, and then passes through openings 176 in central shaft 20 to all of lower radial tubes 146 of lower heat exchange element 142. The reheating fluid passes radially outwardly through each lower radial tube 146 and passes therefrom into each opposite adjacent chord tube 152. The reheating fluid passes through the perforations or openings in lower chord tubes 152 into the interior of vertical rectangular hollow ducts 156. The reheating fluid passes from the interior of each duct 156 into the respective upper chord tube 154, through the openings or perforations therein. The reheating fluid passes from each upper chord tube 154 toward opposite ends thereof into respective adjacent upper radial tubes 148. The reheating fluid flows radially inwardly from each upper radial tube 148 through respective openings 180 in central shaft 20 to lower reheating fluid outlet chamber 178. The reheating fluid then flows through connecting tube 184 to upper reheating fluid outlet chamber 168 and then passes through opening 172 in central shaft 20 into reheating fluid outlet sealed water box 162. The reheating fluid then passes to a suitable reheating fluid discharge.

By the above operation of lower heat exchange element 142, a uniform and progressive reheating of the massecuite is achieved, throughout the vertical height of zone B.

By the unique arrangement of the heat exchange system of the present invention, it will be readily apparent that it is possible to easily achieve a uniform downward movement of the material to be treated from the inlet end to the outlet end of the system. This advantage is specifically due to the vertical nature of the heat exchange system.

It will be further apparent that due to the above described structural features of the present invention it is possible to obtain a substantially vertical flow of the heat exchange fluid throughout the majority of the path thereof in a direction substantially opposite to the direction of flow of the material to be treated.

It will be further apparent that due to the large number of, the construction of, and the location of the structural components, and particularly the vertical plates 56 and 156, of the heat exchange elements, it is possible to obtain a substantially uniform heat exchange relationship throughout the entire horizontal cross-sectional area of the material being treated, at any vertical position thereof.

Finally, it will be apparent that due to the structural arrangement of the heat exchange system of the present invention, it is not necessary to provide stuffing boxes and intermediate bearings to support the central shaft 20. Such elements were inherently necessary in previous continuous heat exchangers, particularly of the type employed for the crystallization processing of sugar massecuite.

Although the above described and illustrated embodiment of the present invention is a particularly preferred construction thereof, it will be readily apparent to those skilled in the art that many structural modifications may be made thereto without departing from the scope of the present invention. Specifically, the above specifically described structure of shell 4, and the manner of reinforcement thereof, are exemplary only. The exact configuration of the shell and the reinforcement structure therefor may be readily modified in manners which would be apparent to those skilled in the art. Further, the precise manner of transfer of the various fluids in area 20a from stationary or non-rotating supply and discharge positions to the interior of rotating central shaft 20 may be achieved by other specific structural arrangements than that illustrated and described. In fact, the various sealed water boxes have been illustrated schematically only, inasmuch as the specific structural features of these elements in and of themselves do not form any part of the present invention, and such features would be well understood to those skilled in the art. Further, the transfer of the various fluids from the area 20a to the various locations of the horizontal radial tubes could be achieved by means other than the connecting tubes and inlet and outlet chambers.

Also, the manner of rotating the dome 28, central shaft 20 and heat exchange elements 42 and 142 is not particularly critical. FIG. 1 schematically illustrates a pair of hydraulic cylinder-piston units 90 which may be connected in a conventional manner to an oil pump and controlled by means of a two-way valve. The piston rods of units 90 would alternately act on drive pins 92 arranged around the periphery of dome 28. Specifically, units 90 would be operated by such two-way valve in a conventional manner to alternately contact and move pins 92, thereby imparting rotation to dome 28, and thus to central shaft 20 and heat exchange elements 42 and 142. One specific such control system for operating pistons 90 to achieve such a rotation is that used for rotating the Silver Ring Diffuser unit. However, it is to be understood that any other conventionally expedient mechanical means for achieving rotation of dome 28 is intended to be within the scope of the present invention.

Furthermore, the size of the various elements, the rotation speed of the heat exchange elements, the rate of flow of the massecuite and heat exchange fluids, the temperatures thereof, and the specific materials of the various elements of the present invention are not set forth in detail in the present application, inasmuch as such features would vary considerably from installation to installation and would be well understood by those ordinarily skilled in the art.

Still further, it is to be understood that the heat exchange system need not include the second, lower heat exchange element 142. Rather, the heat exchange system of the present invention, even when used in the crystallization processing of sugar massecuite, could be constructed to include only the upper cooling heat exchange element 42. Also, it is to be understood to be within the scope of the present invention that heat exchanger system could include more than the two illustrated and described heat exchanger elements. For instance, the system could include three or more vertically aligned heat exchange elements.

Additionally, it is to be understood that the heat exchange system illustrated in FIG. 1 would of necessity be supported by non-illustrated and non-described structure. Further, the various cooling and reheating fluid inlets and outlets, the massecuite inlet, and the massecuite outlet could be connected to known types of supply and discharge systems which could advantageously include known flow regulating equipment. It is further to be understood that massecuite outlet 14 could be provided with a conventional and removable plug. Further, the central portion 14a of the conical bottom portion 12, which as illustrated supports brackets 26, may be made removable, such as for example by flange couplings 14b.

Still further, it is to be understood that the term "tube" as employed to describe elements such as 46, 48, 52, 54, 82, 84, etc., is not intended to limit the structural configuration of such elements as being circular in cross-section. Rather, the elements referred to as "tubes" may have other cross-sectional configurations, such as polygonal.

Further various structural modifications encompassed within the scope of the present invention will be apparent to those skilled in the art.

What is claimed is:

1. A heat exchanger unit comprising:
    a rotatably mounted hollow shaft having first and second ends;
    at least one heat exchange element concentrically surrounding and attached to said shaft, said element comprising:
        a first plurality of hollow radial members extending radially outwardly from said shaft;
        a second plurality of hollow radial members extending radially outwardly from said shaft;
        said first radial members being positioned further from said first end of said shaft than said second radial members, in the axial direction of said shaft;
        each first radial member being aligned in said axial direction with a respective said second radial member;
        each pair of adjacent said first radial members and the axially aligned pair of adjacent second radial members defining a cylindrical sector; and each said sector having extending in said axial direction at least one rectangular hollow duct, the interior of which is in communication with the interiors of the respective pairs of first and second radial members defining such sector;

fluid inlet means for supplying heat exchange fluid from said first end of said shaft to said first radial members, whereby fluid flows radially outwardly through said first radial members, then axially through said hollow ducts, and then radially inwardly through said second radial members; and fluid outlet means for passing said fluid from said second radial members to said first end of said shaft.

2. A unit as claimed in claim 1, wherein each said sector has therein a plurality of rectangular hollow ducts spaced from each other radially of said shaft.

3. A unit as claimed in claim 2, wherein each pair of adjacent said first and second radial members have extending therebetween a plurality of hollow chord members, the interiors of which communicate with the interiors of the respective said radial members and said rectangular hollow ducts.

4. A unit as claimed in claim 3, wherein each said chord member has perforations therein communicating with the interior of the respective said rectangular hollow duct.

5. A unit as claimed in claim 2, wherein said rectangular hollow ducts in adjacent said sectors are radially offset.

6. A unit as claimed in claim 1, wherein said fluid inlet means comprises a first fluid inlet chamber located within said shaft adjacent said first end thereof, a second fluid inlet chamber located within said shaft at a position adjacent said first radial members, and inlet connection means connecting said first and second inlet chambers; and said fluid outlet means comprises a first fluid outlet chamber located within said shaft at a position adjacent said second radial members, a second fluid outlet chamber located within said shaft adjacent said first end thereof, and outlet connection means connecting said first and second outlet chambers.

7. A unit as claimed in claim 6, wherein said inlet and outlet connection means comprise tubes.

8. An apparatus for the continuous heat treatment and stirring of a material, said apparatus comprising:

a shell having an open top and a closed bottom;

means for introducing material to be treated into an upper portion of said shell;

a material outlet located in said bottom for removing treated material from said shell;

a hollow shaft rotatably mounted substantially concentrically within said shell, said shaft having an upper end and a lower end;

means for rotatably supporting said lower end of said shaft at a position adjacent said bottom of said shell;

means, attached to said shaft adjacent said upper end thereof, for rotatably supporting said upper end of said shaft;

at least one heat exchange element concentrically surrounding and attached to said shaft, said element comprising:

a first plurality of hollow radial members extending radially outwardly from said shaft;

a second plurality of hollow radial members extending radially outwardly from said shaft;

said first radial members being positioned further from said upper end of said shaft than said second radial members;

each first radial member being vertically aligned with a respective said second radial member;

each pair of adjacent said first radial members and the vertically aligned pair of adjacent second radial members defining a cylindrical sector; and each said sector having at least one vertically extending rectangular hollow duct, the interior of which is in communication with the interiors of the respective pairs of first and second radial members defining such sector;

fluid inlet means for supplying heat exchange fluid from said upper end of said shaft to said first radial members, whereby fluid flows radially outwardly through said first radial members, then vertically upwardly through said hollow ducts, and then radially inwardly through said second radial members; and fluid outlet means for passing said fluid from said second radial members to said upper end of said shaft.

9. An apparatus as claimed in claim 8, wherein each said sector has therein a plurality of rectangular hollow ducts spaced from each other radially of said shaft.

10. An apparatus as claimed in claim 9, wherein each pair of adjacent said first and second radial members have extending therebetween a plurality of hollow chord members, the interiors of which communicate with the interiors of the respective said radial members and said rectangular hollow ducts.

11. An apparatus as claimed in claim 10, wherein each said chord member has perforations therein communicating with the interior of the respective said rectangular hollow duct.

12. An apparatus as claimed in claim 9, wherein said rectangular hollow ducts in adjacent said sectors are radially offset.

13. An apparatus as claimed in claim 8, wherein said fluid inlet means comprises a first fluid inlet chamber located within said shaft adjacent said upper end thereof, a second fluid inlet chamber located within said shaft at a position adjacent said first radial members, and inlet connection means connecting said first and second inlet chambers; and said fluid outlet means comprises a first fluid outlet chamber located within said shaft at a position adjacent said second radial members, a second fluid outlet chamber located within said shaft adjacent said upper end thereof, and outlet connection means connecting said first and second outlet chambers.

14. An apparatus as claimed in claim 13, wherein said inlet and outlet connection means comprise tubes.

15. An apparatus as claimed in claim 8, wherein said shell bottom is conical, and said material outlet is positioned at the lower center of said conical bottom.

16. An apparatus as claimed in claim 8, wherein said means for supporting said lower end of said shaft comprises a guide bearing mounted on at least one bracket supported by a portion of said bottom of said shell.

17. An apparatus as claimed in claim 16, wherein said portion of said bottom of said shell is removably attached to the remainder of said bottom of said shell.

18. An apparatus as claimed in claim 8, wherein said means for supporting said upper end of said shaft comprises a cover member attached to said shaft and extending substantially radially outwardly therefrom, said cover member having a radial outer portion, and bearing means cooperating between said shell and said outer portion of said cover member for allowing rotation of said cover member with respect to said shell.

19. An apparatus as claimed in claim 18, wherein said bearing means comprises a circular rail mounted on the top of said shell, and a plurality of wheels mounted on said outer portion of said cover member and riding on said rail.

20. An apparatus as claimed in claim 8, further comprising non-rotatable coupling means mounted about said upper end of said shaft for providing individual fluidtight communication to said fluid inlet means and said fluid outlet means.

21. An apparatus for the continuous heat treatment and stirring of a material, said apparatus comprising:
a shell having an open top and a closed bottom;
means for introducing material to be treated into an upper portion of said shell;
a material outlet located in said bottom for removing treated material from said shell;
a hollow shaft rotatably mounted substantially concentrically within said shell, said shaft having an upper end and a lower end;
means for rotatably supporting said lower end of said shaft at a position adjacent said bottom of said shell;
means, attached to said shaft adjacent said upper end thereof, for rotatably supporting said upper end of said shaft;
a first heat exchange element concentrically surrounding and attached to said shaft, said first heat exchange element comprising;
a first plurality of hollow radial members extending radially outwardly from said shaft;
a second plurality of hollow radial members extending radially outwardly from said shaft;
said first radial members being positioned further from said upper end of said shaft than said second radial members;
each first radial member being vertically aligned with a respective said second radial member;
each pair of adjacent said first radial members and the vertically aligned pair of adjacent second radial members defining a cylindrical sector; and
each said sector having at least one first vertically extending rectangular hollow duct, the interior of which is in communication with the interiors of the respective pairs of first and second radial members defining such sector;
first fluid inlet means for supplying a first heat exchange fluid from said upper end of said shaft to said first radial members, whereby said first fluid flows radially outwardly through said first radial members, then vertically upwardly through said first hollow ducts, and then radially inwardly through said second radial members;
first fluid outlet means for passing said first fluid from said second radial members to said upper end of said shaft;
a second heat exchange element concentrically surrounding and attached to said shaft at a position below said first heat exchange element, said second heat exchange element comprising:
a third plurality of hollow radial members extending radially outwardly from said shaft;
a fourth plurality of hollow radial members extending radially outwardly from said shaft;
said third radial members being positioned further from said upper end of said shaft than said fourth radial members;
each third radial member being vertically aligned with a respective said fourth radial member;
each pair of adjacent said third radial members and the vertically aligned pair of adjacent fourth radial members defining a cylindrical sector; and
each said sector having at least one second vertically extending rectangular hollow duct, the interior of which is in communication with the interiors of the respective pairs of third and fourth radial members defining such sector;
second fluid inlet means for supplying a second heat exchange fluid from said upper end of said shaft to said third radial members, whereby said second fluid flows radially outwardly through said third radial members, then vertically upwardly through said second hollow ducts, and then radially inwardly through said fourth radial members; and
second fluid outlet means for passing said second fluid from said fourth radial members to said upper end of said shaft.

22. An apparatus as claimed in claim 21, wherein each said sector in said first and second heat exchange elements has therein a plurality of rectangular hollow ducts spaced from each other radially of said shaft.

23. An apparatus as claimed in claim 22, wherein each pair of adjacent said radial members have extending therebetween a plurality of hollow chord members, the interiors of which communicate with the interiors of the respective said radial members and said rectangular hollow ducts.

24. An apparatus as claimed in claim 23, wherein each said chord member has perforations therein communicating with the interior of the respective said rectangular hollow duct.

25. An apparatus as claimed in claim 22, wherein said rectangular hollow ducts in adjacent said sectors are radially offset.

26. An apparatus as claimed in claim 21, wherein said first fluid inlet means comprises a first fluid inlet chamber located within said shaft adjacent said upper end thereof, a second fluid inlet chamber located within said shaft at a position adjacent said first radial members, and first inlet connection means connecting said first and second inlet chambers; said first fluid outlet means comprises a first fluid outlet chamber located within said shaft at a position adjacent said second radial members, a second fluid outlet chamber located within said shaft adjacent said upper end thereof, and first outlet connection means connecting said first and second outlet chambers; said second fluid inlet means comprises a third fluid inlet chamber located within said shaft adjacent said upper end thereof, a fourth fluid inlet chamber located within said shaft at a position adjacent said third radial members, and second inlet connection means connecting said third and fourth inlet chambers; and said second fluid outlet means comprises a third fluid outlet chamber located within said shaft at a position adjacent said fourth radial members, a fourth fluid outlet chamber located within said shaft adjacent said upper end thereof, and second outlet connection means connecting said third and fourth outlet chambers.

27. An apparatus as claimed in claim 26, wherein said first and second inlet connection means and said first and second outlet connection means comprise tubes.

28. An apparatus as claimed in claim 21, wherein said shell bottom is conical, and said material outlet is positioned at the lower center of said conical bottom.

29. An apparatus as claimed in claim 21, wherein said means for supporting said lower end of said shaft comprises a guide bearing mounted on at least one bracket supported by a portion of said bottom of said shell.

30. An apparatus as claimed in claim 29, wherein said portion of said bottom of said shell is removably attached to the remainder of said bottom of said shell.

31. An apparatus as claimed in claim 21, wherein said means for supporting said upper end of said shaft comprises a cover member attached to said shaft and extending substantially radially outwardly therefrom, said cover member having a radial outer portion, and bearing means cooperating between said shell and said outer portion of said cover member for allowing rotation of said cover member with respect to said shell.

32. An apparatus as claimed in claim 31, wherein said bearing means comprises a circular rail mounted on the top of said shell, and a plurality of wheels mounted on said outer portion of said cover member and riding on said rail.

33. An apparatus as claimed in claim 21, further comprising a non-rotatable coupling means mounted about said upper end of said shaft for providing individual fluid-tight communication to said first and second fluid inlet means and said first and second fluid outlet means.

* * * * *